United States Patent
Herley et al.

(10) Patent No.: US 8,683,869 B2
(45) Date of Patent: Apr. 1, 2014

(54) MONITORING FASTENER PRELOAD

(75) Inventors: Peter E. Herley, Renton, WA (US);
Bruce W. Blayden, Everett, WA (US);
Thomas J. Lowe, Kent, WA (US)

(73) Assignee: The Boeing Company, Chicago, IL (US)

( * ) Notice: Subject to any disclaimer, the term of this patent is extended or adjusted under 35 U.S.C. 154(b) by 635 days.

(21) Appl. No.: 12/536,438

(22) Filed: Aug. 5, 2009

(65) Prior Publication Data
US 2010/0050778 A1 Mar. 4, 2010

Related U.S. Application Data

(60) Provisional application No. 61/190,986, filed on Sep. 4, 2008.

(51) Int. Cl.
*F16B 31/02* (2006.01)

(52) U.S. Cl.
USPC ............................................... 73/761; 73/760

(58) Field of Classification Search
USPC ....................................... 73/761, 760
See application file for complete search history.

(56) References Cited

U.S. PATENT DOCUMENTS

| | | | |
|---|---|---|---|
| 4,114,428 A | 9/1978 | Popenoe | |
| RE30,183 E | 1/1980 | Popenoe | |
| 4,294,122 A | 10/1981 | Couchman | |
| 4,333,351 A * | 6/1982 | Bickford | 73/761 |
| 4,344,216 A * | 8/1982 | Finkelston | 29/407.03 |
| 4,375,121 A * | 3/1983 | Sigmund | 29/407.02 |
| 4,602,511 A | 7/1986 | Holt | |
| 4,791,838 A * | 12/1988 | Bickford et al. | 81/467 |
| 4,846,001 A | 7/1989 | Kibblewhite | |
| 4,899,591 A | 2/1990 | Kibblewhite | |
| 5,018,988 A | 5/1991 | Kibblewhite | |
| 5,029,480 A | 7/1991 | Kibblewhite | |
| 5,112,248 A | 5/1992 | Kibblewhite | |
| 5,131,276 A | 7/1992 | Kibblewhite | |
| 5,205,176 A | 4/1993 | Kibblewhite | |
| 5,216,622 A | 6/1993 | Kibblewhite | |
| 5,220,839 A | 6/1993 | Kibblewhite | |
| 5,412,582 A | 5/1995 | Hesthamar et al. | |
| 5,437,525 A | 8/1995 | Bras | |
| 5,884,232 A | 3/1999 | Buder | |
| 6,009,380 A | 12/1999 | Kibblewhite | |
| 6,009,759 A | 1/2000 | Kibblewhite | |

(Continued)

FOREIGN PATENT DOCUMENTS

| | | |
|---|---|---|
| DE | 19746272 A1 | 4/1999 |
| DE | 19917222 A1 | 11/2000 |

(Continued)

OTHER PUBLICATIONS

International Search Report for PCT/US2010/056888 dated Feb. 10, 2011.

(Continued)

*Primary Examiner* — Max Noori
(74) *Attorney, Agent, or Firm* — Parsons Behle & Latimer

(57) ABSTRACT

The health of a structural joint clamped by fasteners is monitored by directly measuring the preload of the fasteners. The preload is measured by a transducer on the fastener and electronically transmitted to a monitoring station where the preload values may be analyzed to assess the health of the joint.

21 Claims, 10 Drawing Sheets

(56) References Cited

U.S. PATENT DOCUMENTS

| | | |
|---|---|---|
| 6,263,268 B1 | 7/2001 | Nathanson |
| 6,327,921 B1 | 12/2001 | Hsu |
| 6,354,152 B1 * | 3/2002 | Herlik ............................ 73/597 |
| 6,358,051 B2 * | 3/2002 | Lang et al. .................... 433/173 |
| 6,501,211 B1 | 12/2002 | Nasrollahzadeh |
| 6,691,007 B2 | 2/2004 | Haugse |
| 6,965,835 B2 * | 11/2005 | McGee et al. .................. 702/41 |
| 6,988,026 B2 | 1/2006 | Breed |
| 6,990,866 B2 | 1/2006 | Kibblewhite |
| 7,136,785 B2 | 11/2006 | Mast et al. |
| 7,180,404 B2 | 2/2007 | Kunerth |
| 7,246,980 B2 | 7/2007 | Azzalin |
| 7,369,966 B1 * | 5/2008 | Scelsi et al. .................. 702/185 |
| 7,412,808 B2 | 8/2008 | Lavi |
| 7,412,898 B1 | 8/2008 | Smith |
| 7,441,462 B2 | 10/2008 | Kibblewhite |
| 7,559,135 B2 * | 7/2009 | Rode .............................. 29/724 |
| 7,680,565 B2 * | 3/2010 | Balasu et al. ..................... 701/3 |
| 7,703,669 B2 * | 4/2010 | Amirehteshami et al. .... 235/375 |
| 7,983,854 B2 | 7/2011 | O'Brien |
| 2002/0162889 A1 | 11/2002 | Navon |
| 2003/0030564 A1 | 2/2003 | Boyce et al. |
| 2003/0158676 A1 | 8/2003 | Fields et al. |
| 2003/0205187 A1 | 11/2003 | Carlson et al. |
| 2004/0065154 A1 | 4/2004 | Kibblewhite |
| 2004/0067120 A1 | 4/2004 | Spper |
| 2005/0027826 A1 | 2/2005 | Loda |
| 2006/0009924 A1 * | 1/2006 | McGee et al. .................. 702/41 |
| 2006/0025897 A1 | 2/2006 | Shostak |
| 2006/0109118 A1 | 5/2006 | Pelo et al. |
| 2006/0130590 A1 | 6/2006 | Kibblewhite |
| 2006/0214789 A1 | 9/2006 | Posamentier et al. |
| 2006/0243056 A1 | 11/2006 | Sundermeyer et al. |
| 2006/0285441 A1 | 12/2006 | Walker et al. |
| 2008/0061145 A1 | 3/2008 | McGushion |
| 2008/0061984 A1 | 3/2008 | Breed |
| 2008/0110091 A1 | 5/2008 | Perkins et al. |
| 2008/0115589 A1 | 5/2008 | DeRose et al. |
| 2008/0115636 A1 | 5/2008 | DeRose |
| 2008/0178713 A1 | 7/2008 | Long |
| 2009/0038401 A1 | 2/2009 | Kibblewhite |
| 2009/0038402 A1 | 2/2009 | Kibblewhite |
| 2009/0071078 A1 | 3/2009 | Rakow et al. |
| 2009/0112925 A1 | 4/2009 | Amirehteshami |
| 2009/0128169 A1 | 5/2009 | Fay |
| 2009/0157358 A1 | 6/2009 | Kim |
| 2009/0218891 A1 | 9/2009 | McCollough, Jr. |
| 2009/0249878 A1 | 10/2009 | Faber et al. |
| 2010/0050778 A1 | 3/2010 | Herley et al. |
| 2010/0100338 A1 | 4/2010 | Vik et al. |
| 2010/0116887 A1 | 5/2010 | Barken et al. |

FOREIGN PATENT DOCUMENTS

| | | |
|---|---|---|
| EP | 1188521 A2 | 3/2002 |
| WO | WO 2007/034197 | 3/2007 |
| WO | WO2011028362 A1 | 3/2011 |

OTHER PUBLICATIONS

European Patent Office, Examination report for EP Application No. 08253538.6 dated Aug. 3, 2012.

Office Action for U.S. Appl. No. 12/852,855 dated Aug. 2, 2012.

PCT Search Report GB 2006/003523, Glazbrook, Mar. 29, 2007.

"Load Control Technologies I-Bolt®": http://www.innovationplus.com/tech.php, 2001.

"Manufacturers Find Perfect Bolt Preload- Visually": Bruce Vernyi, Jul. 22, 2008 Freelance writer based in Glendale, CA, for Stress Indicators, Inc; Bruce Vernyi, Editor-in-Chief of American Machinist.

http://www.seattle.intel-research.net/wisp/.

US Patent and Trademark Office, Final Office Action for U.S. Appl. No. 12/691,796 dated Jan. 11, 2013.

US Patent and Trademark Office; Office Action for U.S. Appl. No. 12/552,895 dated Mar. 25, 2011.

US Patent and Trademark Office; Office Action for U.S. Appl. No. 12/552,895 dated Oct. 5, 2011.

US Patent and Trademark Office; Office Action for U.S. Appl. No. 12/582,885 dated Dec. 16, 2011.

US Patent and Trademark Office; Final Office Action for U.S. Appl. No. 12/582,885 dated Jul. 17, 2012.

US Patent and Trademark Office; Office Action for U.S. Appl. No. 12/852,855 dated Feb. 25, 2013.

US Patent and Trademark Office, Office Action for U.S. Appl. No. 12/691,796 dated Jul. 19, 2012.

US Patent and Trademark Office, Office Action Dated Oct. 4, 2012 for U.S. Appl. No. 12/536,438.

* cited by examiner

MONITORING FASTENER PRELOAD

CROSS REFERENCE TO RELATED APPLICATIONS

This application claims the benefit of Provisional U.S. Patent Application No. 61/190,986, filed Sep. 4, 2008, which is incorporated by reference herein.

TECHNICAL FIELD

This disclosure generally relates to structural joints clamped by fasteners, and deals more particularly with a method and apparatus for monitoring preload of the fasteners.

BACKGROUND

In order to achieve optimum joint clamp-up, it is desirable to optimize the preload of the fasteners used to clamp the joint. Fastener preload refers to the tension created in a fastener when it is first tightened. The preload of the fastener must be greater than the external forces applied to the joint in order to prevent joint gapping. Optimizing fastener preload allows structural joints to be designed that may reduce weight, and reduce or eliminate the need for retorquing fasteners over time in order to compensate for the affects of structural relaxation.

In the past, setting the tension in a fastener used to clamp a structural joint has been limited to controlling the amount of torque that is applied to the fasteners during installation, using a torque wrench or the like. However, the applied torque may not directly measure fastener preload and therefore may result in a relatively large margin of error. Moreover, once installed, it may be difficult to determine the amount of fastener preload and joint clamp-up, especially after the passage of time.

Accordingly, there is a need for a method and apparatus for directly determining fastener preload and monitoring joint clamp-up over time. It would also be desirable to provide a system for remotely monitoring fastener preload in order to periodically assess the health of structural joints.

SUMMARY

In accordance with a number of the disclosed embodiments, a method and apparatus are provided for directly measuring and monitoring the preload of fasteners such as bolts in order to assess the health of a structural joint and the related structure. The fastener preload may be monitored intermittently or continuously to provide an instant assessment of joint clamp-up. Direct measurement of fastener preload may allow structural joints to be designed that may reduce weight while reducing or eliminating the need for retorquing fasteners in order to compensate for structural relaxation. Additionally, remote monitoring of fastener preload in structural joints may reduce or eliminate the need for time consuming and labor intensive in-service inspection regimes.

According to one disclosed embodiment, a method is provided of monitoring the preload of fasteners installed on a structure. The method includes measuring the value of preload of each of the fasteners and electronically transmitting the measured preload values from the fasteners to a monitoring station which may be remote from the fasteners. The method further includes using a programmed computer to analyze the measured preload values at the monitoring station. The measured preload values may be transmitted through wires or wirelessly. The method may further comprise reading an identifier at each of the fasteners that uniquely identifies the fastener, and transmitting the identifier from each of the fasteners to the monitoring station. The method may also comprise assessing the health of the structure based on the analysis of the preload values.

According to another embodiment, a method is provided for monitoring the health of a structure. The method includes electronically measuring the preload of each of a plurality of fasteners on the structure, and using the measured preloads to assess the health of the structure. The measuring includes using a transducer on the fastener to sense the preload on the fastener. Using the measured preloads includes comparing the measured preloads with a set of reference values related to the health of the structure.

According to other embodiments, a method is provided of monitoring the preload of fasteners installed on an airplane. The method includes measuring the values of preload on each of the fasteners and generating an electronic data file containing the measured values of preload. The electronic data file may be used to display the measured values of preload. Measuring the values of the preload may include using a transducer on each of the fasteners to sense the preload of the fastener, and reading the value of the sensed preload from the transducer. The value of the sensed preload may be read by placing a reader on each of the fasteners and using a reader to record the sensed preload. The reader may also be used to read an identifier on the fastener that uniquely identifies the fastener. A programmed computer at the monitoring station may be used to compare the measured values of preload with a set of reference values. The method may further comprise displaying a representation of the location on the airplane of a fastener whose preload has been measured.

In accordance with still other embodiments, a fastener installation and preload measurement method is provided. The method includes specifying a set of fasteners to be installed on a structure, and providing the set of fasteners. A set of preload measurement transducers are provided and are affixed to the fasteners. A set of unique identifiers are generated that respectively link the fasteners to the transducers. The method includes installing the fasteners on the structure, and using the transducers affixed to the fasteners to measure the preloads on the fasteners installed on the structure.

In accordance with still other embodiments, a system is provided for installing fasteners on a structure and monitoring the health of the structure. The method may include assigning serial numbers respectively to a plurality of fasteners and generating a fastener installation plan that specifies the location on the structure where each of the fasteners is to be installed. The fasteners are installed on the structure according to the installation plan, and an electronic data file is generated that associates the serial numbers with the installation location of each of the fasteners. Transducers on the fasteners are used to measure the value of the preload on each of the fasteners. The method further includes using the database and the measured values of preload to monitor the health of the structure. Assigning the serial numbers respectively to the fasteners may include assigning a unique serial number to each of the transducers on the fasteners. A computer may be used to collect the measured values of preload and to populate the database with measured values of preloads. The step of monitoring the health of the structure may include displaying the serial numbers of the fasteners and the corresponding measure values of the preloads of the fasteners.

According to further embodiments, apparatus is provided for monitoring the preload of fasteners installed on a structure. The apparatus includes a transducer on each of the fasteners for sensing the preload on the fastener and for generating a signal related to the sensed preload. A monitoring station monitors the signals generated by the transducers, and means are provided for transmitting the signals from each of the transducers to the monitoring station. The monitoring station may include a computer for analyzing the sensed preloads. The apparatus may further comprise an identifier on each of the transducers that uniquely identifies the transducer, and wherein the transmitting means is operable for transmitting each of the identifiers to the monitoring station. In one variation, the transmitting means includes a wireless transmitter for wirelessly transmitting the signals from the transducer to the monitoring station. In some variants, the transmitting means may include a radio frequency identification (RFID) tag. The apparatus may also include a reader coupled with transmitting means for reading the signals generated by the RFID tag.

The disclosed embodiment satisfy the need for a method and apparatus of directly measuring the preload of fasteners used to clamp a structural joint that is accurate and efficient, while allowing the health of the joint and related structure to be monitored intermittently or continuously.

BRIEF DESCRIPTION OF THE ILLUSTRATIONS

DETAILED DESCRIPTION

Figure 1:
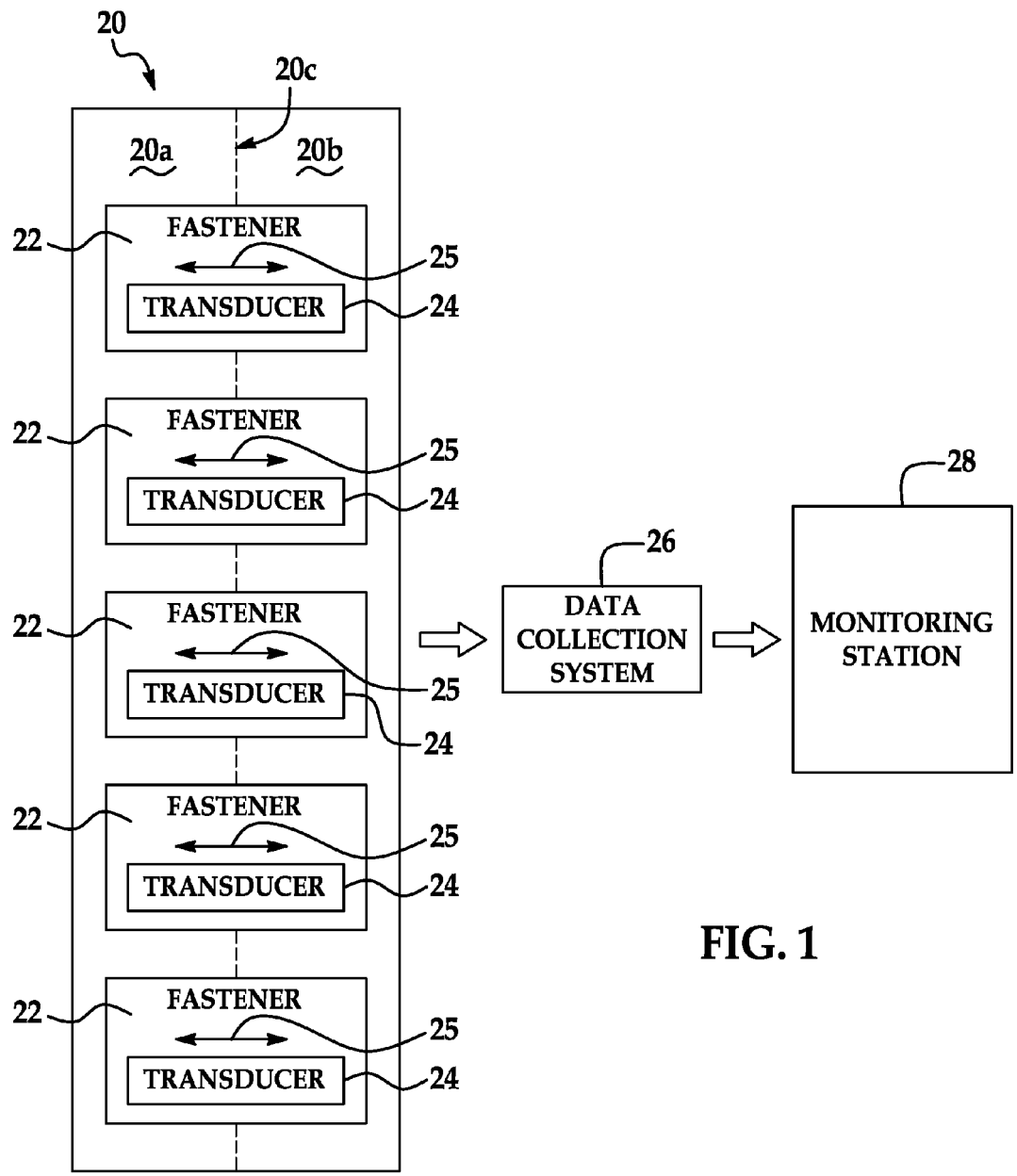
FIG. 1 is an illustration of a block diagram of apparatus for monitoring the health of a structural joint clamped by fasteners.

Referring first to FIG. 1, the disclosed embodiments relate to a method and apparatus for measuring the preload of each of a plurality of fasteners 22 installed on a structure 20 to clamp together two structural members 20a, 20b forming a structural joint 20c. As used herein, "preload" generally refers to the amount of longitudinal tension 25 created in the fastener 22 when tightened against the structural members 20a, 20b. The tension 25 on each of the fasteners 22 is directly related to the amount of clamping force that clamps the structural members 20a, 20b together. Thus, the preloads of the fasteners 22 may be related to qualities of the joint 20c of interest, such as, without limitation, its integrity, which may also be referred to throughout the description as the "health" of the joint 20c and the related structure 20. While the drawings illustrate the use of the disclosed embodiments to measure the preload on fasteners used to clamp two structural members forming a single, simple structural joint, the disclosed method and apparatus may also be used to measure fastener preload where the fasteners 22 are used to clamp multiple structural members having any of a variety of shapes and joint configurations.

Each of the transducers 24 is installed on a corresponding fastener 22 and is operable to directly measure the preload of the fastener 22. The preload values of the fasteners 22 measured by the transducers 24 may be transferred to a monitoring station 28 by means of a data collection system 26. As will be discussed later in more detail, the data collection system 26 may comprise any of a wide range of known techniques for transferring data, including those using hardwire transmission, wireless transmission, or a combination thereof. The monitoring station 28 may comprise a stationary or portable hand-held device located in proximity to a structure 20, or may comprise other computerized systems that may be located remote from the structure 20.

Figure 2:
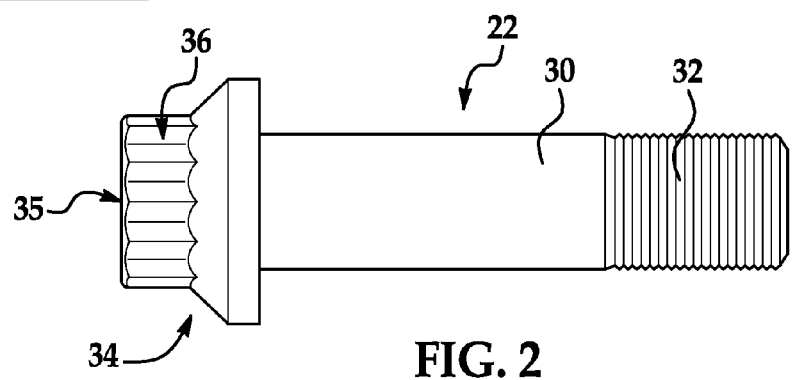
FIG. 2 is an illustration of a perspective view of a typical fastener whose preload may be measured using the system shown in FIG. 1.
Figure 3:
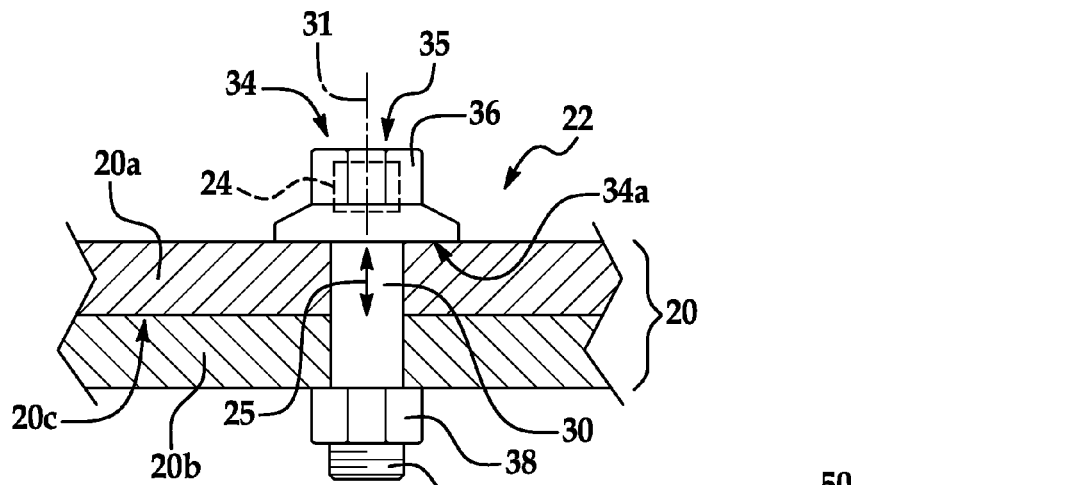
FIG. 3 is an illustration of a cross sectional view of a structural joint clamped by fasteners of the type illustrated in FIG. 2.

Referring now to FIGS. 2 and 3, the fastener 22 may comprise any of a wide range of hardware devices that may be used to mechanically join, affix or clamp two or more members together. For example, the fastener 22 may comprise, without limitation, a bolt, screw, stud, clamp, or pin, to name only a few. For convenience in the present description, a bolt 22 is illustrated which includes a shank 30 having an external threaded end 32 and a head 34. The head 34 may include wrench flats 36 adapted to be engaged by a suitable wrench or other tool (not shown) used to install and/or tighten the bolt 22. As shown in FIG. 3, the head 34 may include a shoulder 34a for engaging one of the structural members 20a while a nut 38 on the threaded end 32 is used to engage the other structural member 20b. Torque applied to the nut 38 or the head 34 clamps members 20a, 20b together with a clamping force during the installation process. In accordance with the disclosed embodiment, the transducer 24 may be mounted within a recess 35 in the head 34, generally in axial alignment 31 with the shank 30. The transducer 24 may be held on the head 34 by any suitable means such as an adhesive. It should be noted here that the transducer 24 may be mounted on the threaded end 32 of the bolt 22, or on the bolt head 34 either with or without a recess.

Figure 4:
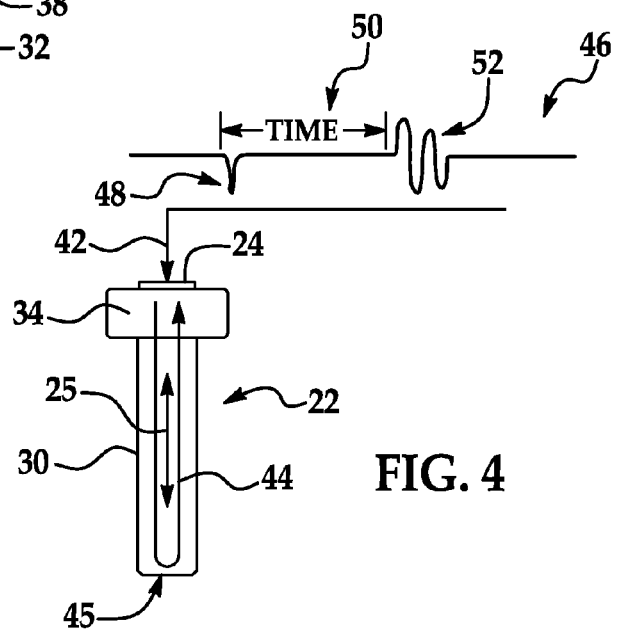
FIG. 4 is an illustration of a diagram useful in describing a pulse-echo measurement technique for measuring the preload of a fastener.

The transducers 24 may comprise any of a variety of sensors or transducers using any of various technologies suitable for measuring one or more parameters that are related to the tension 25 in the fastener 22. One suitable known transducer 24 is illustrated in FIG. 4 which uses ultrasonic techniques to measure a "time-of-flight" that is directly related to the tension 25 or preload of the fastener 22. A voltage pulse applied to the transducer 24 at 42 propagates through the shank 30 as an ultrasonic wave 48 that is reflected off of the end 45 of the fastener 22 and travels back along the return path 44 to the transducer 24. The ultrasonic wave 48 is returned as an echo 52 that is recorded by the transducer 24, and which has a time of flight 50 that is directly proportional to the preload of the fastener 22. Evaluating the change in the time-of-flight 50 relative to the zero load time-of-flight allows direct measurement of the preload. During tightening, the fastener 22 elongates with load while the speed of the ultrasonic wave 48 reduces with increasing fastener 22 stress, resulting in an increase in the total time-of-flight that is directly proportional to load. As previously mentioned, while an ultrasonic transducer 24 has been illustrated, transducers 24 utilizing other technologies may be possible. As previously mentioned, while an ultrasonic transducer 24 has been illustrated, transducers 24 utilizing other technologies may be possible.

Figure 5:
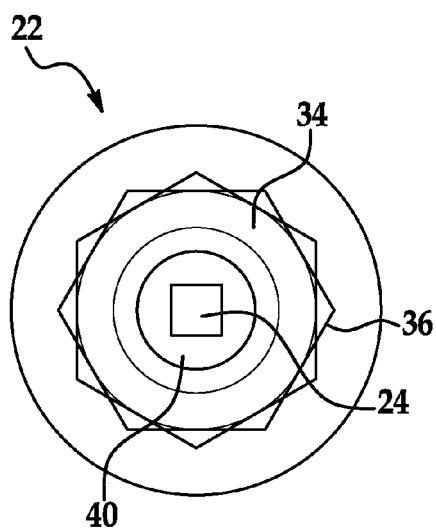
FIG. 5 is an illustration of an end view of one embodiment of the fastener having a barcode identifier.

Referring to FIG. 5, the fastener 22 may carry an identifier, such as a serial number that uniquely identifies the fastener 22. For example, the identifier may comprise a visual pattern or indicia such as a barcode 40 which in the illustrated example is located on the head 34 of the fastener 22. A variety of other forms of identifiers may be used, including, for example and without limitation, digital information representing a numeric value that is stored in a memory (not shown) mounted on the fastener 22 and/or integrated into the transducer 24.

Figure 6:
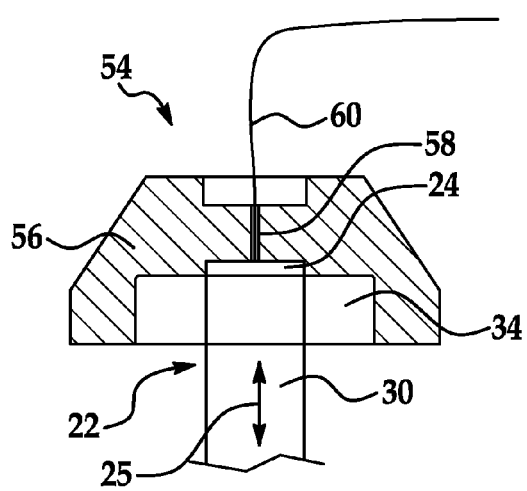
FIG. 6 is an illustration of a cross sectional view of one form of a reader installed on a fastener.
Figure 7:
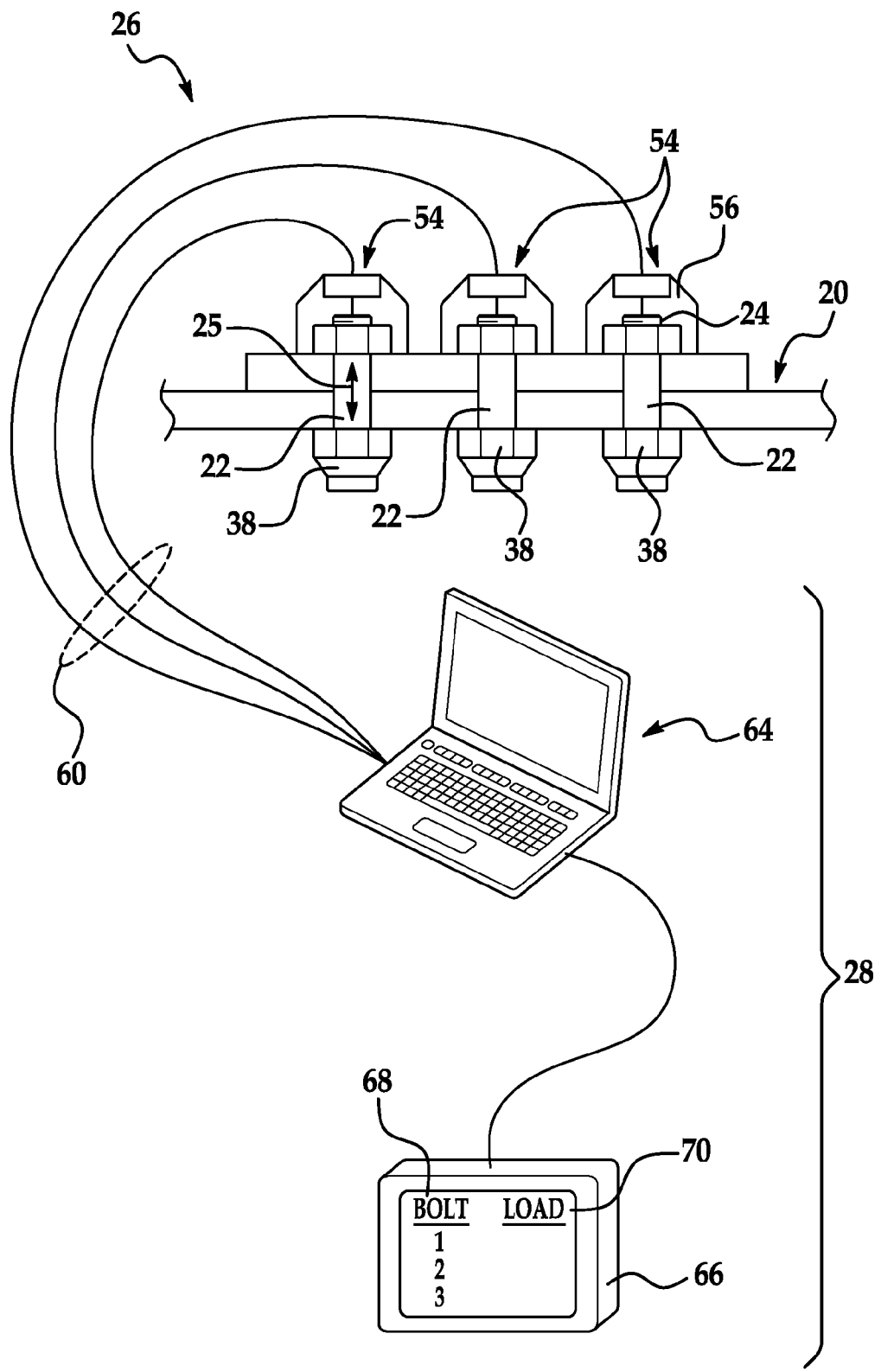
FIG. 7 is an illustration of a diagram showing apparatus for measuring the preload on a plurality of fasteners using readers of the type illustrated in FIG. 6.

Attention is now directed to FIGS. 6 and 7 which illustrate one form of data collection system 26 (FIG. 1) used to collect measured values of preloads from a plurality of fasteners 22 and display and/or compare the measured values with a set of reference values. The data collection system 26 includes one or more readers 54 that are operable for reading information from the transducers 24, including but not limited to preload values and identifiers. As best seen in FIG. 6, each of the readers 54 may comprise a cap 56 fitted over the head 34 of a fastener 22. The cap 56 includes an electrical probe 58 that may engage electrical contacts (not shown) on the transducer 24. The probe 58 is coupled by an electrical lead 60 to a computer 64. The cap 56 may be either removably or permanently installed on the fasteners 22. In one embodiment, the caps 56 are removably installed on the fasteners 22 so that a single set of the caps 56 along with a portable computer 64 may be used to measure the preloads of fasteners 22 at various locations on a structure 20. As shown in FIG. 7, the monitoring station 28 may further include an electronic display 66 coupled with the computer 64 in order to display various information, such as, without limitation, fastener serial numbers 68 and corresponding measured preload values 70. In other embodiments, a set of reference values (not shown) may be displayed along with the measured values 70 so that a user can determine whether the value of measured preload for a particular fastener 22 is within tolerance.

Figure 8:
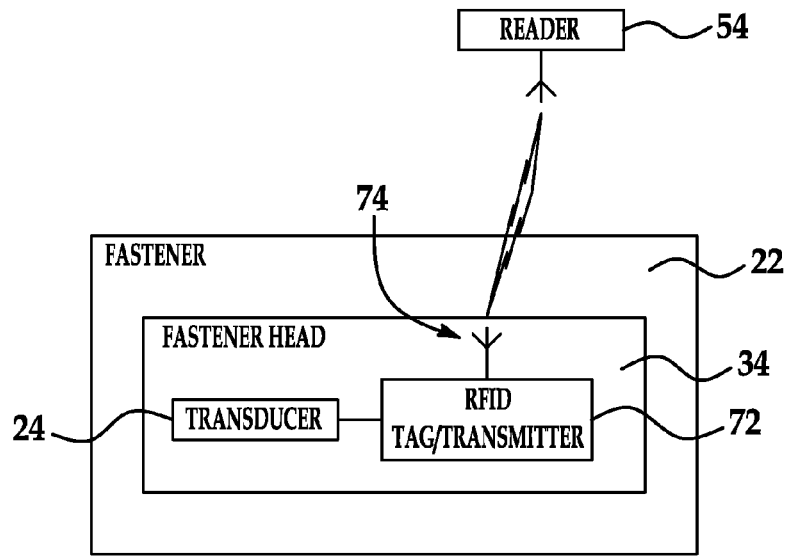
FIG. 8 is an illustration of a broad block diagram of an alternate form of the fastener capable of wirelessly transmitting measured preload values.

FIG. 8 illustrates another embodiment of a fastener 22 in which a radio frequency identification (RFID) tag 72 is mounted on the fastener head 34 and is operably connected to the transducer 24. The RFID tag 72 is operable for reading the preload measurement performed by the transducer 24 and for transmitting electrical signals representing the measured values via an antenna 74 to a local monitoring station 28 (FIG. 1) or to a reader 54 which includes a wireless receiver (not shown) for receiving the transmitted signals.

The RFID tags 72 may be either of an active or passive type. Active RFID tags may be powered by an internal battery and may include both read and write modes, i.e. tag data can be rewritten and/or modified. Passive RFID tags may operate without an internal power source and may obtain operating power that is generated by the reader 54. Passive RFID tags may have shorter read ranges than active tags and may require a higher power reader. RFID tags 72 are advantageous in that they utilize noncontact, non-line-of-site wireless technology to read and write data. The reader 54 may comprise a handheld, portable unit, or may comprise a fixed unit that is located locally. A single reader 54 may be used to read the RFID tags 72 on multiple fasteners 22. Each of the RFID tags 72 may include a unique identifier such as a serial number which is transmitted along with the measured preload values and uniquely identifies the associated fastener 22.

Figure 9:
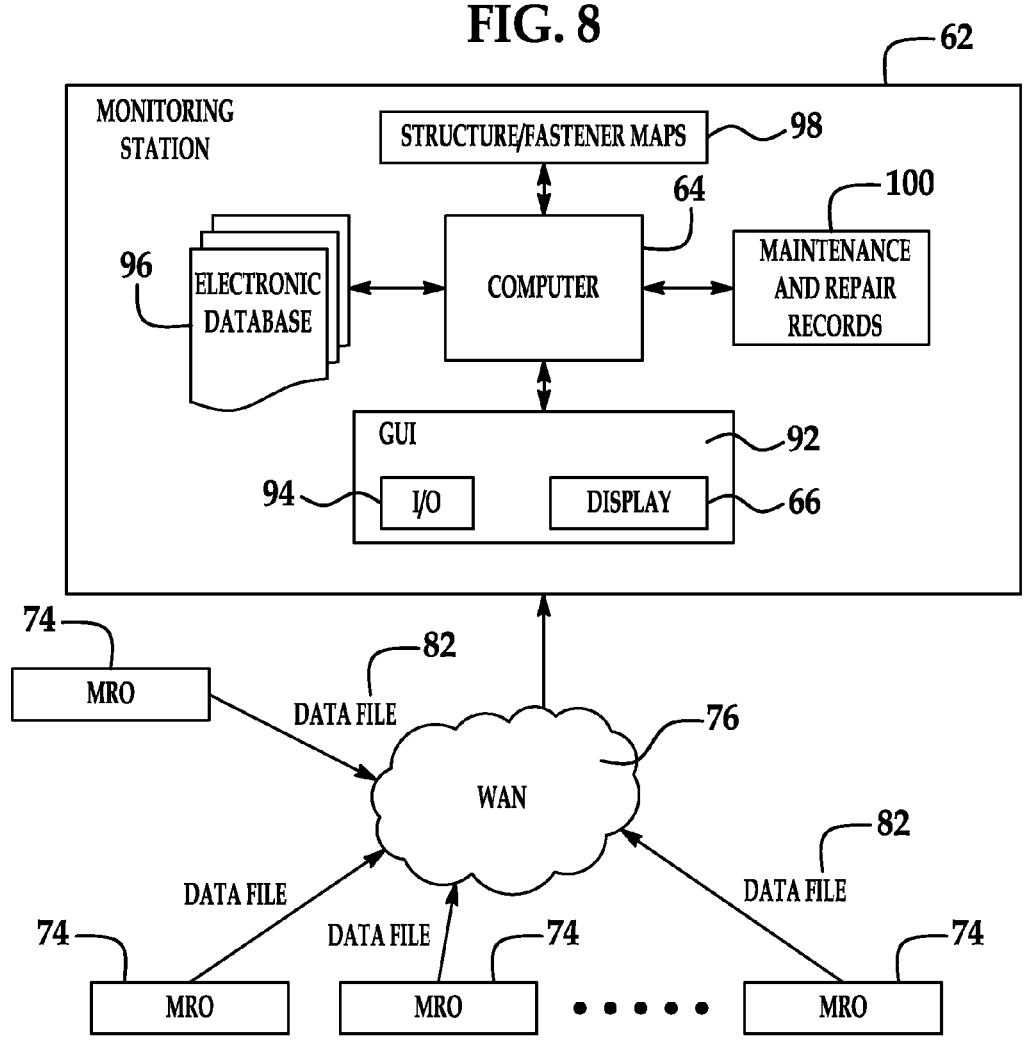
FIG. 9 is an illustration of a block diagram of a system for monitoring of fastener preloads on multiple aircraft located at differing remote sites.

The method and apparatus for measuring preloads on fasteners 22 and monitoring the health on structural joint 20c (FIG. 1) may be advantageously used in a variety of industries and applications, including throughout the transportation industry, and for structural applications such as, without limitation, bridges, nuclear reactors, and petrochemical plants, to name only a few. FIG. 9 illustrates the use of the disclosed embodiments in the context of maintaining and servicing a fleet of aircraft which may be located at various airports (not shown) where the aircraft are serviced or repaired by a local maintenance and repair organizations (MRO) 74 located at or nearby an airport.

Figure 10:
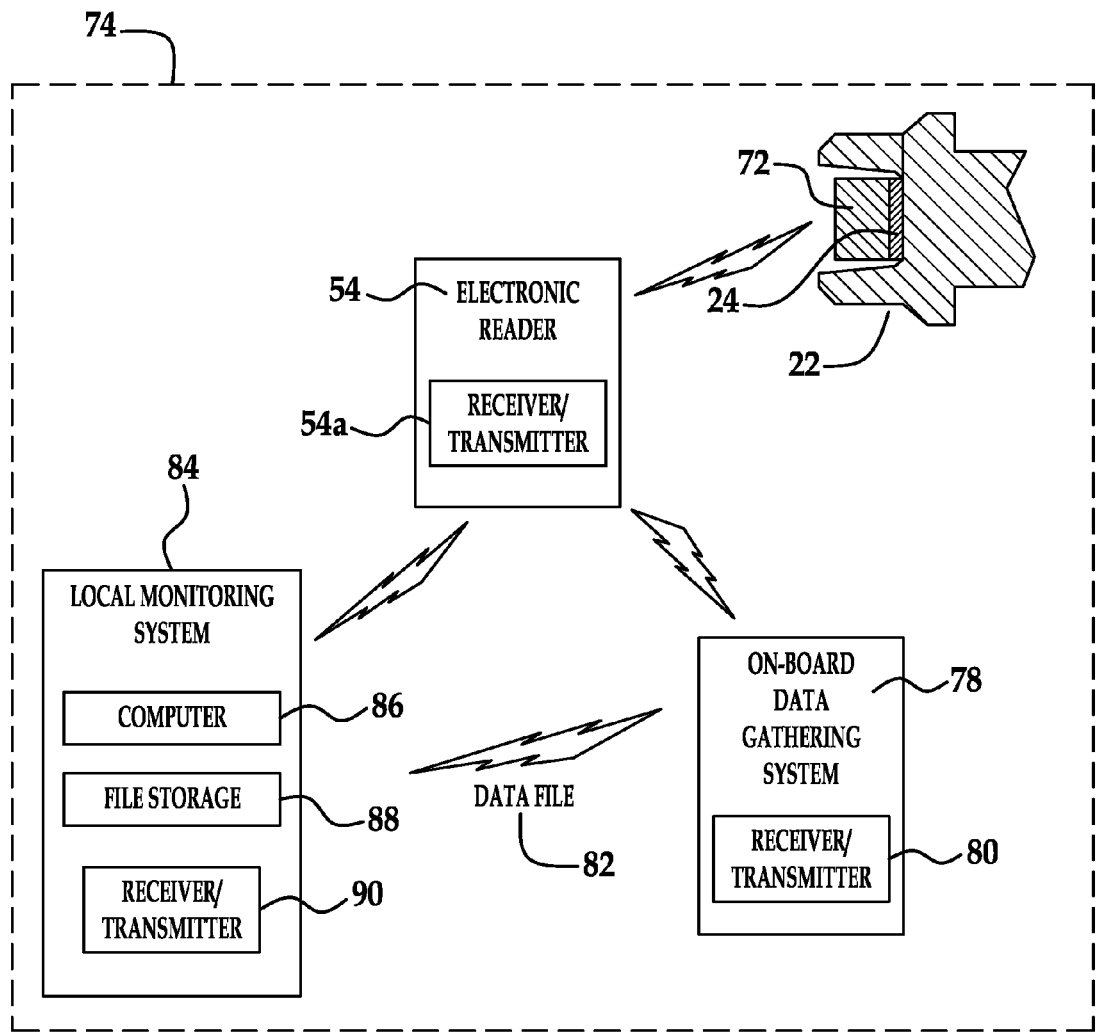
FIG. 10 is an illustration of a combined block and diagrammatic view of a system for collecting measured preloads on structures at one of the remote sites shown at FIG. 9.

FIG. 10 illustrates components of a system located at each of the MRO's 74 for collecting information regarding the health of the aircraft. The collected information may be transmitted to a central monitoring station 62 (FIG. 9) which may comprise an airplane manufacturer, supplier or other organization. One or more fasteners 22 equipped with preload measuring transducers 24 may include a wireless transmitter such as that forming part of a RFID tag 72. Maintenance and service personnel may use a reader such as a portable electronic reader 54 to read each of the tags 72 in order to collect the measured preload values and corresponding serial numbers of the fasteners 22. The electronic reader 54 may include a receiver/transmitter 54a for retransmitting the data to an on-board data gathering system 78 or alternatively, directly to a local monitoring system 84 on-site at the MRO 74. The on-board data gathering system 78 may include a receiver/transmitter 80 for receiving the data read by the reader 54 and for retransmitting this information as one or more data files 82 to the local monitoring system 84. The local monitoring system 84, which may be at the MRO 74, may include a computer 86 and suitable file storage 88.

Referring now to FIG. 9, each of the MRO's 74 may use the data files 82 in connection with servicing and maintaining the aircraft however, optionally, each of the MROs 74 may transmit the data files 82 via a wide area network 76, such as the Internet, to the central monitoring station 62. The central monitoring station 62 may include a computer 64 coupled with a graphical user interface (GUI) 92. The GUI 92 may include a suitable electronic display 66 and one or more input/output devices 94 to allow a user to communicate with the computer 64. The computer 64 may access various maps 98 and similar data files that may be used to graphically display sections of aircraft where fasteners 22 may require preload monitoring. The computer 64 may also have access to various maintenance and repair records 100, including archival information relating to the health of various systems and structures on the aircraft as well as reference values representing tolerance ranges for fastener preload. The data files 82 collected by the monitoring station 62 from the MROs 74 may be stored in an electronic database 96 along with other information derived from the map data 98 and maintenance and repair records 100.

Figure 11:
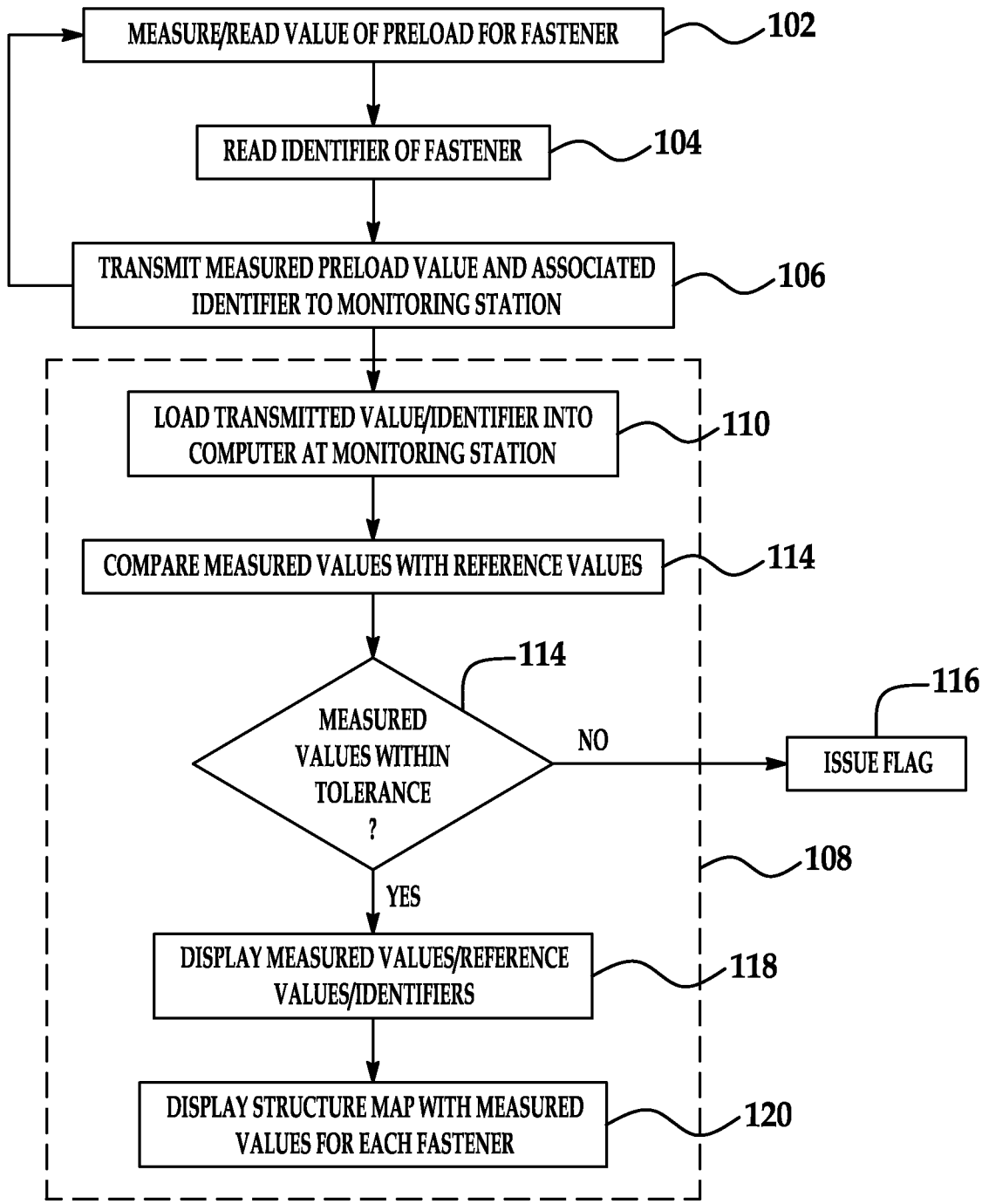
FIG. 11 is an illustration of a flow diagram broadly showing the steps of a method of monitoring the health of a structural joint that includes direct measurement of fastener preload.

FIG. 11 broadly illustrates the steps of a method for measuring fastener preload and monitoring the health of structural joints according to the disclosed embodiments. Beginning at step 102, the value of preload for a fastener is measured and read, and at 104, an identifier for the fastener is read. At 106, the measured preload value and the associated identifier are transmitted to the monitoring station 28. Steps 102, 104, and 106 are repeated for each of the fasteners 22. Having collected the measured preload values and associated identifiers, the preload values may be analyzed using any of a series of steps at 108. For example, and without limitation, at 110, the transmitted preload values and identifiers may be loaded into a computer 64 at the monitoring station 28. The computer 64 may be used to compare the measured preload values with a set of reference values, as shown at step 112. If any of the measured preload values are not within tolerance, then a flag can be issued at 116 in the form of a visual display or other alarm. At step 118, the measured preload values, the reference values and the identifiers may be displayed using, for example, an electronic display 66 (FIG. 7). Optionally, as shown at step 120, a map or other representation of a structure 20 may be displayed along with the measured preload values for each of the fasteners 22 in the structure 20.

Figure 12:
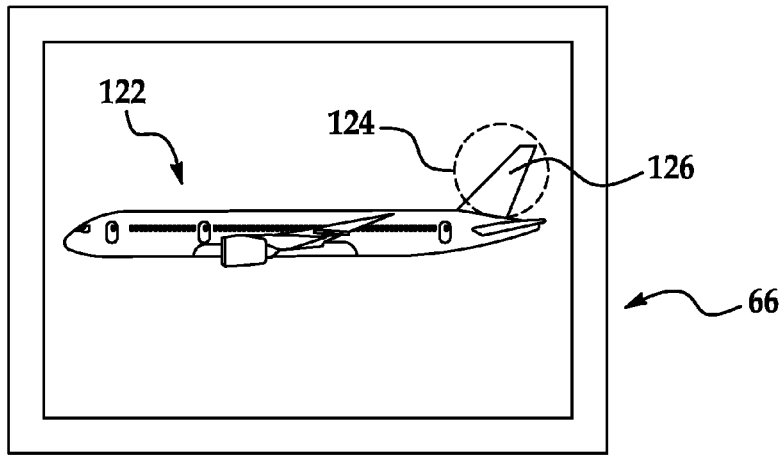
FIG. 12 is an illustration of a computer screen display showing an airplane equipped with fasteners that allow direct measurement of fastener preload.
Figure 13:
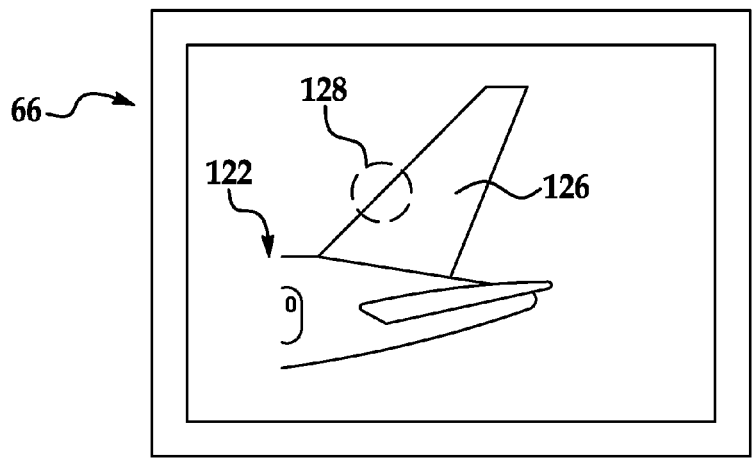
FIG. 13 is an illustration of a computer screen display showing a selected area of interest on a vertical stabilizer of the airplane shown in FIG. 12.
Figure 14:
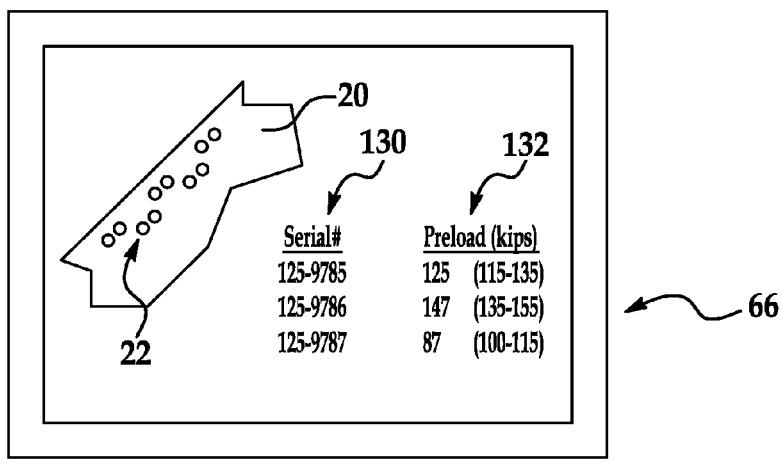
FIG. 14 is an illustration of a computer screen display showing a structural joint in the region of interest illustrated in FIG. 13, along with serial numbers and measured preloads of fasteners in the joint.

Attention is now directed to FIGS. 12-14 which illustrate how database files including the measured preload values can be used to monitor the health of a structure, such as an airplane 122, which is shown on an electronic display 66. Using a mouse or other pointer, a user may select an area 124 for examination which, in the illustrated example, comprises a vertical stabilizer 126. As shown in FIG. 13, the user may examine a particular area 128 of the vertical stabilizer 126 which, when selected, may result in a display similar to that shown in FIG. 14 in which the fasteners 22 within the selected area 128 (FIG. 13) are shown along with serial numbers 130 of the fasteners 22, and the measured preload values 132 for the fasteners 22. A range of preload values representing an acceptable tolerance is indicated within parenthesis.

Figure 15:
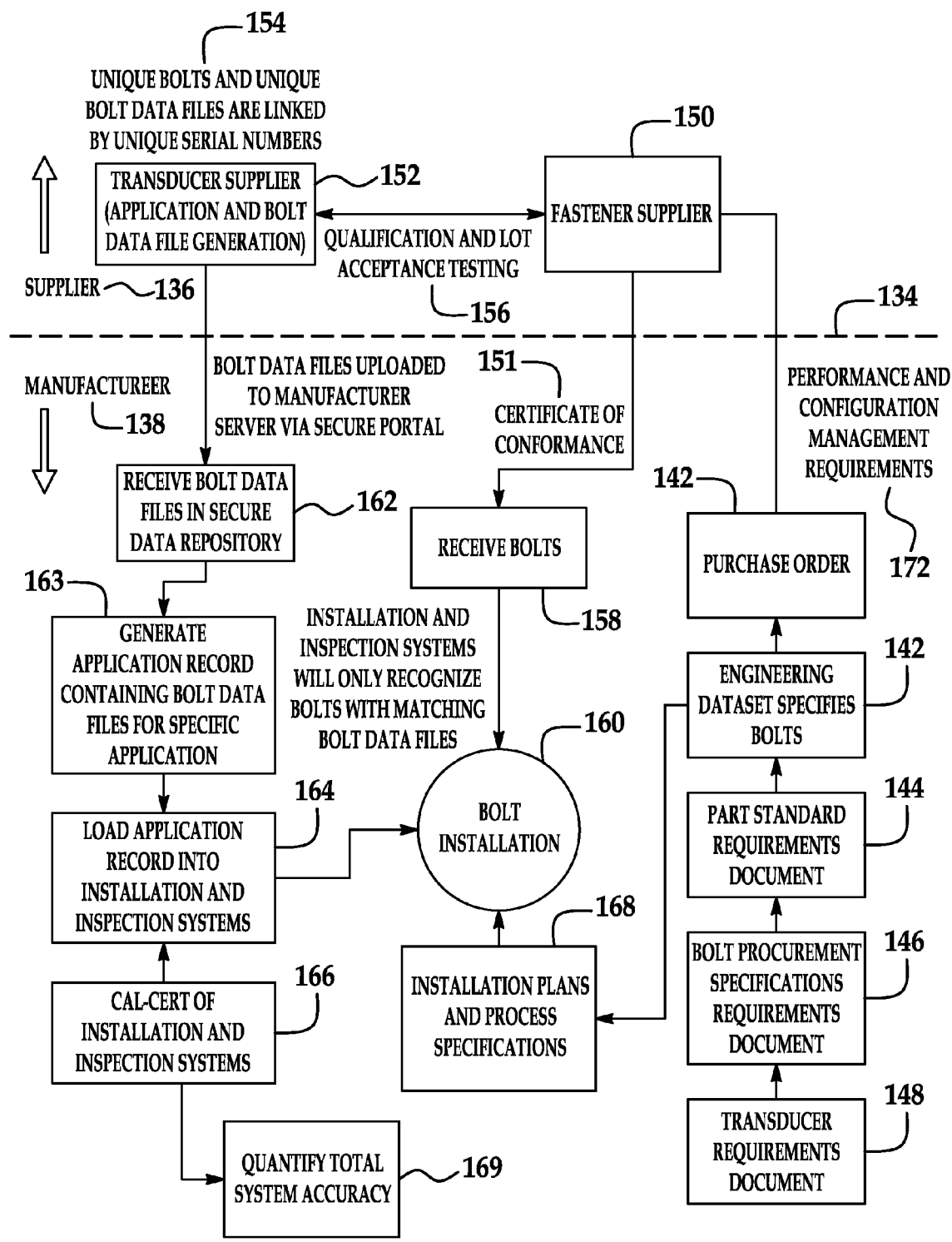
FIG. 15 is an illustration of architecture, in block diagram form, for producing and installing fasteners on a structure that allow direct measurement of fastener preload.

Attention is now directed to FIG. 15 which illustrates architecture defining a system for specifying, sourcing and installing fasteners 22 on a structure 20 that allows direct measurement of fastener preload. Beginning at 140, a data set is generated that specifies characteristics of the fasteners that are required for a given structural application. Purchase orders are issued for the fasteners at 142 based on the data set 140 as well as part standards document 144, procurement specification document 146 and transducer requirements document 148. These specifications establish the performance and configuration management requirements 172 for the fasteners 22. In the illustrated example, certain functions separated by the broken line 134 are separately performed by a supplier 136 and a manufacturer 138, however in other applications, all functions may be performed by the manufacturer.

The purchase order 142 may be sent to a fastener supplier 150 who may order the transducers 24 from a transducer supplier 152 and provide the transducer supplier with a definition of the fasteners 22 to be equipped with the transducers 24. The transducer supplier 152 may generate fastener data files containing ultrasonic parameters for each of the transducers 24 and may assign unique serial numbers to each of the transducers 24 and associated data files so that the unique fasteners are linked by the unique serial numbers to the transducers and to the associated data files containing the ultrasonic parameters for the transducer 24. In one embodiment, each of the fastener data files may include two data files associated with each fastener 22. One of these two data files may be a unique file referred to as a fastener record that contains the fastener barcode number and other bits of desired record data. The other data file is may be referred to as a part record that may contain (among other things) the specific voltage to excite the transducer 24, the polynomial equations that translate time-of-flight to load, temperature compensation equations, etc. Each of the fasteners 22 has its own fastener record, whereas like-families of fasteners 22 may all use the same part record. The fastener record may act as an index to the correct part record.

The transducer supplier 152 ships the transducers 24 to the fastener supplier 150, and provides the fastener data files to the manufacturer 138. In other embodiments, the transducer supplier 152 may provide the fastener data files to the fastener supplier 150 where the fastener supplier 150 may have the capability to validate the transducers 24 and thus be competent to certify the transducers 24 to the manufacturer 138; in this case, the fastener supplier 150 may provide the fastener data files to the manufacturer 138. The fastener supplier 150 normally performs qualification and lot acceptance testing 156 on the transducers 24 supplied by the transducer supplier 152 before and/or after the transducers 24 are affixed to the fasteners 22.

The fastener supplier 150 certifies conformance of the fasteners to the manufacturer's performance and configuration management requirements at 151, ships the transducer equipped fasteners 22 to the manufacturer 138 who receives the fasteners at 158. The transducer supplier 152 may electronically transfer electronic bolt data files to the manufacturer's 138 secure data repository 162 containing the unique serial numbers and ultrasonic parameters associated with each fastener 22. The manufacturer 138 generates an electronic application record file 163 that may contain a description of the fasteners 22 as well as their unique serial numbers. The electronic application record file 163 forms part of an installation system 164 that is used to install the fasteners 22 in an installation 160. Calibration and certification 166 of the installation and inspection systems 164 is performed and the Cal-Cert values are used to quantify the total system accuracy 169. The fasteners 22 are installed by the manufacturer 138 at 160 using the installation system 164 according to the installation plan and associated process specifications 168. From the forgoing, it may be appreciated that the fastener installation process utilizes unique serial numbers to link each of the fasteners 22 to a specific transducer 24 and to a set of ultrasonic parameters for that transducer 24. This linking allows tracing of the transducers 24 to the transducer supplier 152, and to the fastener supplier 150 affixes the transducer 24 a fastener 22.

Figure 16:
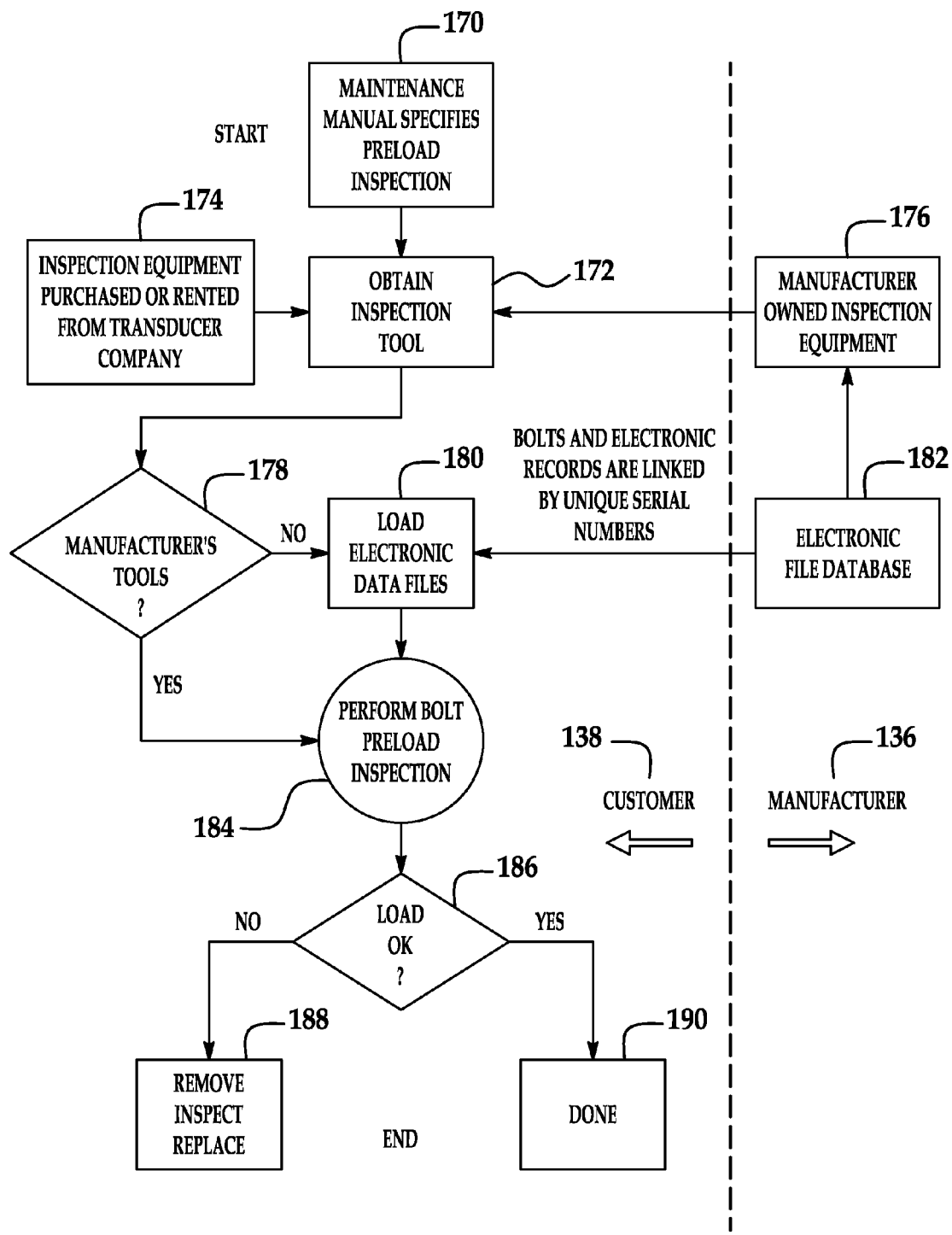
FIG. 16 is an illustration of architecture, in block diagram form, for measuring fastener preload on a structure.

FIG. 16 illustrates architecture for directly measuring the preload of a set of fasteners 22 and for monitoring the health of a structural joint clamped by the fasteners. In the illustrated example, functions are divided according to those provided by a manufacturer 136 and those provided by a customer 138, however in other examples, the customer 138 may perform all of the functions shown in FIG. 16. At 170, a maintenance manual is used to specify inspection processes carried out to measure the preload on a set of fasteners 22. A set of inspection tools are obtained at 172, at least some of which may be sourced from a transducer supply company at 174. The electronic file database 182 previously described which contains unique serial numbers of the transducers is loaded into the inspection equipment at 176 which forms part of the tools obtained at 172. The manufacturer 136 may also download the electronic file database 182 to the customer 138. If the customer 138 is using manufacturer-supplied tools its own tools that have been loaded with the electronic database files linking the fasteners 22 with the unique serial numbers, then the tools can be used at 184 to perform the fastener preload inspection. If, however, the customer 138 is using tools that have not been loaded with this data, then the electronic data files are loaded at 180 before the inspection is performed at 184. At 186 a determination is made as to whether each measured preloading value is satisfactory. If it is not satisfactory, i.e. it is outside of an acceptable range, then the fastener 22 may be removed, inspected and replaced at 188. Otherwise, the measured preload value is acceptable, the inspection process ends at 190.

Figure 17:
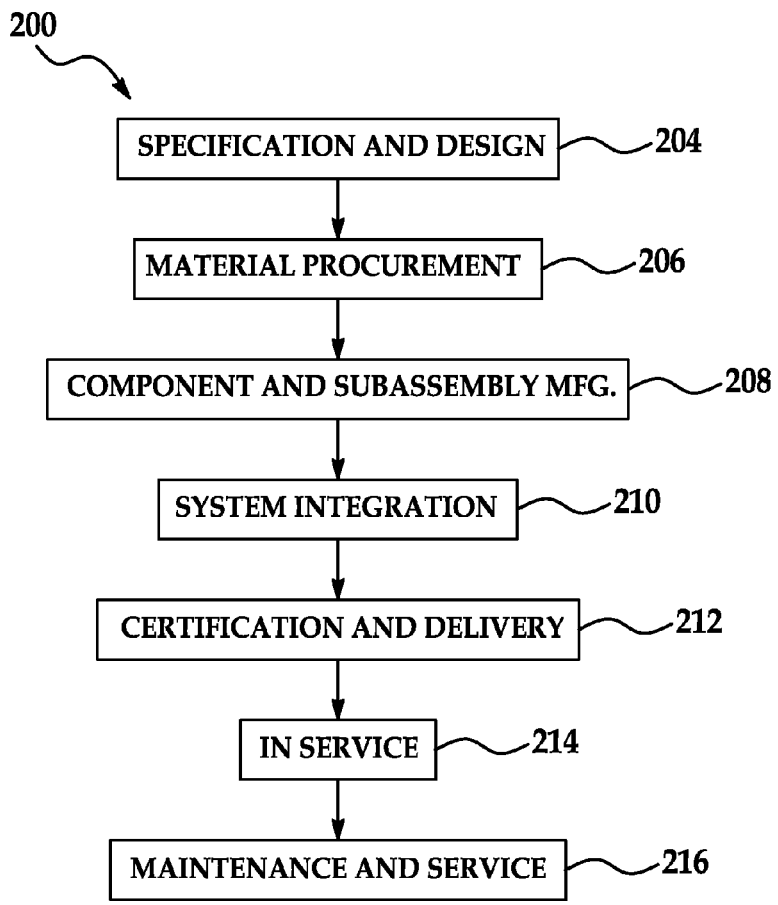
FIG. 17 is an illustration of a flow diagram of aircraft production and service methodology.
Figure 18:
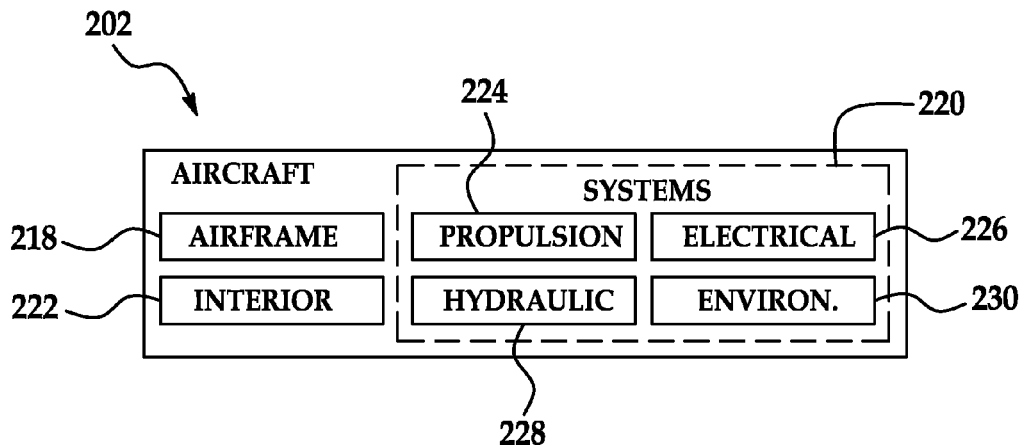
FIG. 18 is an illustration of a block diagram of an aircraft.

Embodiments of the disclosure may find use in a variety of potential applications, particularly in the transportation industry, including for example, aerospace, marine and automotive applications. Thus, referring now to FIGS. 17 and 18, embodiments of the disclosure may be used in the context of an aircraft manufacturing and service method 200 as shown in FIG. 17 and an aircraft 202 as shown in FIG. 18. During pre-production, exemplary method 200 may include specification and design 204 of the aircraft 202 and material procurement 206 in which the disclosed embodiments may be specified for use in installing fasteners in the aircraft 202. During production, component and subassembly manufacturing 208 and system integration 210 of the aircraft 202 takes place. The disclosed embodiments may be used to install fasteners used in the components and subassemblies. Thereafter, the aircraft 202 may go through certification and delivery 212 in order to be placed in service 214. While in service by a customer, the aircraft 202 is scheduled for routine maintenance and service 216 (which may also include modification, reconfiguration, refurbishment, and so on). The disclosed method may be used to check or monitor the preload of fasteners during the maintenance and service 146.

Each of the processes of method 200 may be performed or carried out by a system integrator, a third party, and/or an operator (e.g., a customer). For the purposes of this description, a system integrator may include without limitation any number of aircraft manufacturers and major system subcontractors; a third party may include without limitation any number of vendors, subcontractors, and suppliers; and an operator may be an airline, leasing company, military entity, service organization, and so on.

As shown in FIG. 18, the aircraft 202 produced by exemplary method 200 may include an airframe 218 with a plurality of systems 220 and an interior 222. The disclosed embodiments may be used to install fasteners in joints forming part of the airframe 218. Examples of high-level systems 220 include one or more of a propulsion system 224, an electrical system 226, a hydraulic system 228, and an environmental system 230. Any number of other systems may be included. Although an aerospace example is shown, the principles of the disclosure may be applied to other industries, such as the marine, heavy equipment, power generation, refinery, and automotive industries.

The disclosed embodiments may be employed to measure the preload of fasteners installed on the aircraft 202 during any one or more of the stages of the production and service method 200. For example, components or subassemblies corresponding to production process 208 may incorporate fasteners requiring accurate measurement of preload. Also, one or more method embodiments, or a combination thereof may be utilized during the production stages 208 and 210, for example, by substantially expediting assembly of or reducing the cost of an aircraft 202. Similarly, the disclosed embodiments may be used to monitor the preload of fasteners while the aircraft 202 is in service.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method of monitoring the preload of fasteners installed on a vehicle, comprising:
measuring the value of fastener preload of each of the fasteners;
electronically transmitting the measured preload values from each of the fasteners to a monitoring station;
using a programmed computer to monitor the measured preload values at the monitoring station; and
assessing the health of the vehicle based on comparing the measured preload values with reference values.

2. The method of claim 1, wherein transmitting the measured preload is performed wirelessly.

3. The method of claim 1, further comprising:
reading an identifier at each of the fasteners that uniquely identifies the fastener; and
transmitting the unique identifier from each of the fasteners to the monitoring station.

4. The method of claim 1, wherein using the programmed computer to monitor the measured preload values includes:
using the programmed computer to analyze the measured preload values, and
displaying each of the measured preload values.

5. A method of monitoring the preload of fasteners installed on an airplane, comprising:
reading an identifier on the fastener that uniquely identifies the fastener;
associating each identifier with a corresponding preload value;
measuring the values of preload on each of the fasteners;
using a transducer on each of the fasteners to sense the preload of the fastener;
reading the value of the sensed preload from the transducer;
generating an electronic data file containing the measured values of preload; and
using the electronic data file to display the measured values of preload.

6. The method of claim 5, further comprising:
electronically transmitting the measured preload values from on-board the airplane to the monitoring station, and
wherein displaying the measured preload values is performed at the monitoring station.

7. The method of claim 5, further comprising:
using a programmed computer at the monitoring station to compare the measured values of preload with a set of reference values.

8. The method of claim 5, further comprising:
displaying a representation of the location on the airplane of a fastener whose preload value has been measured.

9. A method of monitoring the health of a vehicle, comprising:
electronically measuring the preload of each of a plurality of fasteners on the vehicle; and,
using the measured preloads to assess the health of the vehicle, wherein using the measured preloads includes comparing the measured preloads with a set of reference values related to the health of the vehicle.

10. The method of claim 9, wherein the measuring includes using a transducer on the fastener to sense the preload on the fastener.

11. A fastener installation and preload measurement method, comprising:
    specifying a set of fasteners to be installed on a structure;
    providing the set of fasteners;
    providing a set of preload measurement transducers;
    affixing the transducers to the fasteners;
    generating a set of unique identifiers respectively linking the fasteners to the transducers;
    installing the fasteners on the structure; and
    using the transducers affixed to the fasteners to measure the preloads on the fasteners installed on the structure.

12. The system of claim 11, wherein generating the unique identifiers includes assigning unique serial numbers respectively to the transducers.

13. The system of claim 12, further comprising:
    generating a plan for installing the fasteners on the structure, and
    wherein the fasteners are installed according to the plan using the serial numbers assigned to the transducers.

14. The system of claim 11, further comprising:
    using a computer to collect the measured values of preload; and
    using a computer and the unique identifiers to display the measured values of preload of the fasteners.

15. Apparatus for monitoring the preload on fasteners installed on a structure, comprising:
    a transducer on each of the fasteners for sensing the preload on the fastener and generating a signal related to the sensed preload;
    an identifier on each of the transducers that uniquely identifies the transducer;
    a monitoring station for monitoring the signals generated by the transducers, including a computer for analyzing the sensed preloads; and
    means for transmitting the signals from each of the transducers to the monitoring station, the transmitting means is operable for transmitting each of the identifiers to the monitoring station.

16. The apparatus of claim 15, wherein the transmitting means includes a wireless transmitter for wirelessly transmitting the signals from the transducers to the monitoring station.

17. The apparatus of claim 15, further comprising:
    a reader coupled with the transmitting means for reading the signals generated by the transducer.

18. The method of claim 9, the electronically measuring further comprising placing a reader over each of the plurality of fasteners on the structure to engage the transducer on the fastener with a probe of the reader.

19. The method of claim 9 further comprising accessing maintenance and repair records to assess the health of the structure.

20. The method of claim 7 further comprising comparing the measured values of preload with a tolerance range for the preload.

21. The method of claim 1 further comprising using the programmed computer to continuously monitor the measured preload values at the monitoring station.

* * * * *